(12) United States Patent
Nakaya

(10) Patent No.: US 6,233,372 B1
(45) Date of Patent: May 15, 2001

(54) WAVEGUIDE PATH TYPE POLARIZATION INDEPENDENT OPTICAL WAVELENGTH TUNABLE FILTER

(75) Inventor: Ken-ichi Nakaya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/258,789

(22) Filed: Mar. 1, 1999

(30) Foreign Application Priority Data

Mar. 3, 1998 (JP) .................................................. 10-069377

(51) Int. Cl.[7] .................................................. G02B 6/126
(52) U.S. Cl. ................................ 385/11; 385/27; 385/39; 385/40
(58) Field of Search .................................. 385/11, 7, 14, 385/27–29, 39, 40

(56) References Cited

U.S. PATENT DOCUMENTS

| | | | |
|---|---|---|---|
| 4,359,260 | * 11/1982 | Reinhart et al. | 385/11 |
| 5,483,609 | * 1/1996 | Nakaya | 385/29 |
| 5,611,004 | * 3/1997 | Chang et al. | 385/11 |
| 5,815,609 | * 9/1998 | Toyohara | 385/2 |

FOREIGN PATENT DOCUMENTS 4-51114  2/1992 (JP) .
4-159516 6/1992 (JP) .

OTHER PUBLICATIONS

Tian et al., "Polarization–Independent Integrated Optical, Acoustically Tunable Double–Stage Wavelength Filter in LiNbO3", J. Lightwave Tech., vol. 12 No. 7, pp. 1192–1197, Jul. 1994.*

* cited by examiner

Primary Examiner—John D. Lee
Assistant Examiner—Michael J. Stahl
(74) Attorney, Agent, or Firm—McGuireWoods LLP

(57) ABSTRACT

A waveguide path type polarization independent optical wavelength tunable filter includes two polarization beam splitters consisting of Ti diffusion optical waveguide paths and anisotropic waveguide paths formed on a dielectric surface, respectively, and a mode converter consisting of the Ti diffusion optical waveguide path, a surface acoustic wave interdigital transducer and an acoustic wave absorber. A layered film consisting of an $SiO_2$ film and an Si film is formed right on the Ti diffusion optical waveguide paths of the polarization beam splitters and a metal film is formed right on the anisotropic optical waveguide paths. By so arranging, the TE polarization component of a non-selected light and the TM polarization component of a non-selected light, both of which are noise components for filter characteristics, are absorbed and removed by the layered $SiO_2$ and Si films and the metal film.

7 Claims, 8 Drawing Sheets

WAVEGUIDE PATH TYPE POLARIZATION INDEPENDENT OPTICAL WAVELENGTH TUNABLE FILTER

BACKGROUND OF THE INVENTION

1. Field of the Invention

The present invention relates to a waveguide path type optical device used in an optical wavelength division multiplex transmission system, and more particular to a waveguide path type polarization independent optical wavelength tunable filter used in a wavelength tunable multiplexer-demultiplexer for multiplexing and demultiplexing any signal optical wavelength.

2. Description of the Related Art

There is proposed, as a conventional filter, an optical wavelength filter wherein a channel type optical waveguide path is provided on a substrate, a surface wave exciting electrode is provided on the substrate through a buffer layer in the vicinity of a middle portion of the input terminal and output terminal of the channel type optical waveguide path, and an element for separating two linearly polarized lights orthogonal to each other is provided in the vicinity of said middle portion and the output terminal (Japanese Patent Application Laid-Open No. 4-51114).

There is also proposed an optical wavelength filter wherein a channel type optical waveguide path is provided on a substrate exhibiting an acousto-optic effect, and a surface wave exciting electrode, a phase shifter electrode and a polarized light separation element are provided on the channel type optical waveguide path (Japanese Patent Application Laid-Open No. 4-159516).

Recently, however, as optical communication systems have been put to practical use, demand rises for a high-capacity, multifunctional, advanced communication system. Also, the addition of new functions of such as generating a higher speed optical signal, multiplexing wavelengths within a single light transmission path, and switching over and changing light transmission paths are required.

In these circumstances, as optical fiber amplifiers have been, in particular, rapidly put to practical use, an optical wavelength division multiplex transmission (WDM) system is being developed actively.

The WDM transmission cannot be realized without a wavelength tunable multiplexer-demultiplexer for multiplexing and demultiplexing any signal optical wavelength. A wide range of wavelength tunable widths, high speed operation and the like are required of an optical wavelength tunable filter used in the wavelength tunable multiplexer-demultiplexer.

As for optical wavelength tunable filters, TE (transverse-electric)-TM (transverse-magnetic) mode conversion type filters using the AO (acousto-optic) effect capable of easily tuning a selected wavelength by changing the frequency of a surface acoustic wave are being developed extensively.

FIG. 1 is a view for showing the structure of a conventional TE-TM mode conversion type waveguide path type polarization independent optical wavelength tunable filter.

The wavelength tunable filter shown therein is obtained by forming a titanium (Ti) diffusion optical waveguide paths $1a$, $1b$ and anisotropic optical waveguide paths $2a$, $2b$, $2c$ and $2d$ are formed on the surface of a substrate $4a$ of an X-cut lithium niobate ($LiNbO_3$).

Portions having slightly higher refraction indexes than the substrate $4a$ become the Ti diffusion optical waveguide paths $1a$, $1b$ and the anisotropic optical waveguide paths $2a$, $2b$, $2c$ and $2d$. The Ti diffusion optical waveguide paths $1a$ and $1b$ are formed by thermally diffusing Ti to the substrate $4a$, whereas the anisotropic optical waveguide paths $2a$, $2b$, $2c$ and $2d$ are formed by thermally diffusing Ti to the substrate $4a$ and then conducting ion (proton) exchange processing.

A surface acoustic wave (SAW) excitation interdigital transducer $5a$ and surface acoustic wave absorbers $6a$ and $6b$ are provided right over the Ti diffusion optical waveguide paths $1a$ and $1b$.

The polarization beam splitter $11a$ consists of the Ti diffusion optical waveguide paths $1a$, $1b$ and the anisotropic optical waveguide paths $2a$, $2b$. The polarization beam splitter $11b$ consists of the Ti diffusion optical waveguide paths $1a$, $1b$ and the anisotropic optical waveguide paths $2c$, $2d$. The TE-TM mode converter $12a$ consists of the Ti diffusion optical waveguide paths $1a$, $1b$ and the surface acoustic wave (SAW) exciting interdigital transducer $5a$.

Now, the operational principle of this wavelength tunable filter will be described.

First, description will be given to the operations of the TE-TM mode converter $12a$ of the polarization beam splitter, taking the polarization beam splitter $11a$ as an example.

FIG. 2 is a view for explaining the operation of the polarization beam splitter $11a$.

In FIG. 2, a TE polarization component $15a$, which is an extraordinary ray, and a TM polarization component $15b$, which is an ordinary ray, of a light $14a$ incident on the Ti diffusion optical waveguide path $1a$ are separately introduced to the anisotropic optical waveguide path $2a$ and the Ti diffusion optical waveguide path $1a$, respectively at a polarized light separation basic structural part $10a$.

Further, the TE polarization component $15a$ is multiplexed to the Ti diffusion optical waveguide path $1b$ at a polarized light separation basic structural part $10b$. Both of the polarization components $15a$ and $15b$ of the incident light $14a$ are, therefore, polarization-separation outputted to the Ti diffusion optical waveguide paths $1b$ and $1a$, respectively.

Likewise, as regards a light $14d$ incident on the Ti diffusion optical waveguide path $1b$, a TE polarization component $15g$ and a TM polarization component $15h$ of the incident light $14d$ are separation-polarization outputted to the Ti diffusion optical waveguide paths $1a$ and $1b$, respectively.

It is noted that the TE mode refers to the component of the wave-guided light $14a$ which electric field is parallel to the substrate, whereas the TM mode refers to the component of the guided wave light $15$ which electric field is perpendicular to the substrate.

Next, the operation of the TE-TM mode converter $12a$ will be described. FIG. 3 is a view for explaining the operation of the TE-TM mode converter.

In FIG. 3, the surface acoustic wave excited by applying an RF signal $13a$ from an oscillation circuit to the interdigital transducer $5a$ acts as a periodic refractive index grating for the wave-guided light $15a$ and $15b$.

In this case, it is assumed that the guided wave $15a$ has only a TE polarization component and the guided wave $15b$ has only a TM polarization component.

By using the X cut lithium niobate substrate and setting the direction of optical wave transmission to Y direction, the Ti diffusion optical waveguide paths $1a$ and $1b$ differ in the effective refractive index of both the TE and TM modes.

If the following phase matching conditional equation (1), where the refractive index grating period formed by the surface acoustic wave is Λ and the effective refractive indexes of the TE mode and TM mode are NTE and NTM, respectively, is satisfied, a wavelength λ is subjected to TE-TM mode conversion by interaction with the refractive index grating.

$$\lambda = |N_{TE} - N_{TM}| \Lambda \qquad (1)$$

The refractive index grating period Λ is inversely proportional to the frequency f of the RF signal 13a. Due to this, it is possible to change easily wavelength λ to be subjected to TE-TM mode conversion by changing the frequency of the RF signal 13a. Thus, by appropriately setting the frequency of the RF signal 13a, any wavelength can be subjected to TE-TM mode conversion.

In case of the mode converter 12a, therefore, the TE polarization wave-guided light 15a, only if it is the wave-guided light of a wavelength satisfying the phase matching condition with respect to the refractive index grating period Λ, is TE-TM mode converted to a TM polarization wave-guided light 15c on the Ti diffusion optical waveguide path 1b.

On the other hand, on the Ti diffusion optical waveguide path 2a, the TM polarization guided wave 15b, only if it is a guided wave of a wavelength satisfying the phase matching condition with respect to the refractive index grating period Λ, is TE-TM mode converted to a TE polarization wave-guided light 15d.

Based on the operations of the above-stated polarization beam splitters 11a, 11b and the mode converter 12a, the operational principle of the wavelength tunable filer will be described with reference to FIG. 1.

In FIG. 1, the light 14a applied from an input port 3a is separated into the TE polarization component 15a and the TM polarization component 15b introduced to the Ti diffusion optical waveguide paths 1b and 1a, respectively, by the polarization beam splitter 11a.

Only the wavelength which satisfies the phase matching condition by interaction with the refractive index grating Λ, of the TE polarization component 15a incident on the Ti diffusion optical waveguide path 1b is converted from the TE polarization component 15a to a TM polarization component 15c by the TE-TM mode converter 12a. Thereafter, the resultant TM polarization component 15c is introduced to the Ti diffusion optical waveguide path 1b by the polarization beam splitter 11b and is outputted as the TM polarization component of the light 14c from a port 3d.

The TE polarization component 15a which has not been subjected to mode conversion is introduced to the Ti diffusion optical waveguide path 1a by the polarization beam splitter 11b and outputted as the TE polarization component of the light 14b from a port 2c.

Meanwhile, only the wavelength which satisfies the phase matching condition by interaction with the refractive index grating Λ, of the TM polarization component 15b incident on the Ti diffusion optical waveguide path 1a is converted from the TM polarization component 15b to a TE polarization component 15d by the TE-TM mode converter 12a as in the same manner as stated above. Thereafter, the resultant TE polarization component 15d is introduced to the Ti diffusion optical waveguide path 1b by the polarization beam splitter 11b and outputted as the TE polarization component of the light 14c from the port 3d.

The TM polarization component 15b which has not been subjected to mode conversion is introduced to the Ti diffusion optical waveguide path 2a by the polarization beam splitter 11b and outputted as the light 14b from the port 3c. By appropriately setting the frequency of the RF signal 13a, therefore, it is possible to select only a desired wavelength as an outgoing light 14c from the port 3d no matter how the input light 14a is polarized. It is also possible to output only non-selected light as the outgoing light 14b from the port 3c.

FIG. 4A is an explanatory view showing an example of light intensity attenuated wavelength characteristics (to be referred to as "filter characteristics" hereinafter) of the output light 14c from the port 3d of the conventional waveguide path type polarization independent optical wavelength tunable filter stated above. FIG. 4B is an explanatory view showing an example of filter characteristics of the output light 14b from the port 3c thereof.

The problem with the conventional filter is, however, that the attenuation of the non-selected light intensity in respect of the light intensity of the selected central wavelength does not exceed a certain level throughout wavelength bands in the filter characteristics of the selected light 14c. The reason for the problem will be described with reference to FIG. 5 as shown below.

In FIG. 5, the TM polarization component 15c of the selected light, which has been subjected to mode conversion as stated above, is introduced to the Ti diffusion waveguide path 1b. At the same time, at the polarized light separation basic structural part 10a, the TE polarization component 15e of the non-selected light with polarized light separation quantity according to the control accuracy of, for example, an actual production process is incident on the Ti diffusion optical waveguide path 1b.

Likewise, on the Ti diffusion optical waveguide path 1a, the TE polarization component 15d of the selected light which has been subjected to mode conversion passes through the anisotropic optical waveguide path 2b and introduced to the Ti diffusion optical waveguide path 1b. At the same time, at the polarized light separation basic structural part 10d, the TM polarization component 15f of the non-selected light with polarized light separation quantity according to the control accuracy of, for example, an actual production process, is incident on the Ti diffusion optical waveguide path 1b.

As a result, the TE polarization component 15e of the non-selected light incident on the Ti diffusion optical waveguide path 1b and the TM polarization component 15f of the non-selected light become noise components for the selected light, thereby deteriorating attenuation characteristics. The noise components are resulted from the polarized light separation characteristics of the polarization beam splitter according to the control accuracy of, for example, an actual production process. For that reason, it is difficult to improve filter characteristics.

SUMMARY OF THE INVENTION

It is, therefore, an object of the present invention to provide a waveguide path type polarization independent optical wavelength tunable filter with a high tolerance during manufacture, capable of easily improving filter characteristics.

A waveguide path type polarization independent optical wavelength tunable filter according to the present invention comprises a dielectric substrate; two polarization beam splitters provided on the dielectric substrate; and a TE-TM mode converter arranged between the two polarization beam splitters on the dielectric substrate. The two polarization beam splitters include a first optical waveguide path formed on a surface of the dielectric substrate and an anisotropic optical waveguide path. At least one of the polarization beam splitters is formed on the first optical waveguide path, and includes a first thin film formed on the first optical waveguide path and having a refractive index lower than that of the first optical waveguide path; a second thin film formed on the first thin film and having a refractive index higher than that of the first optical waveguide path; and a metal film formed on the anisotropic optical waveguide path of at least one of the polarization beam splitters. The TE-TM mode converter includes a second optical waveguide path continuous to the first optical waveguide path of the polarization beam splitters formed on the surface of the substrate; and an interdigital transducer, arranged right on the second optical waveguide path, for exciting a surface acoustic wave.

According to the waveguide path type polarization independent optical wavelength tunable filter of the present invention, a layered film, consisting of the first thin film having a refractive index lower than that of the optical waveguide path and the second thin film having a refractive index higher than that of the optical waveguide path, is formed right on the optical waveguide path of the polarization beam splitter. Due to this, the TE polarization component of the non-selected light on the optical waveguide path is transferred to the layered film and removed from the interior of the optical waveguide paths.

Meanwhile, by forming a metal film right on the anisotropic optical waveguide path, the TM polarization component of the non-selected light on the anisotropic optical waveguide path is absorbed by the metal film and removed from the interior of the anisotropic optical waveguide path.

As described above, according to the waveguide path type polarization independent optical wavelength tunable filter of the present invention, a layered film, consisting of the first thin film having a refractive index lower than that of the optical waveguide path and the second thin film having a refractive index higher than that of the optical waveguide path, is formed right on the optical waveguide path of the polarization beam splitter, and a metal film is formed right on the anisotropic optical waveguide path.

Due to this, the layered film of the first and second thin films allows the non-selected light components on the optical waveguide path to be transferred to the layered film, to thereby remove the components from the interior of the optical waveguide path. In addition, the non-selected light components on the anisotropic waveguide path can be absorbed by the metal film to thereby remove the components from the interior of the anisotropic waveguide path.

Accordingly, it is possible to easily remove noise resulting from the non-selected light components in the polarization beam splitters and to thereby improve filter characteristics without the need to ensure strict accuracy for manufacturing the polarization beam splitter parts.

DESCRIPTION OF THE PREFERRED EMBODIMENTS

The waveguide path type polarization independent optical wavelength tunable filter in embodiments according to the present invention will be described hereinafter.

Figure 1:
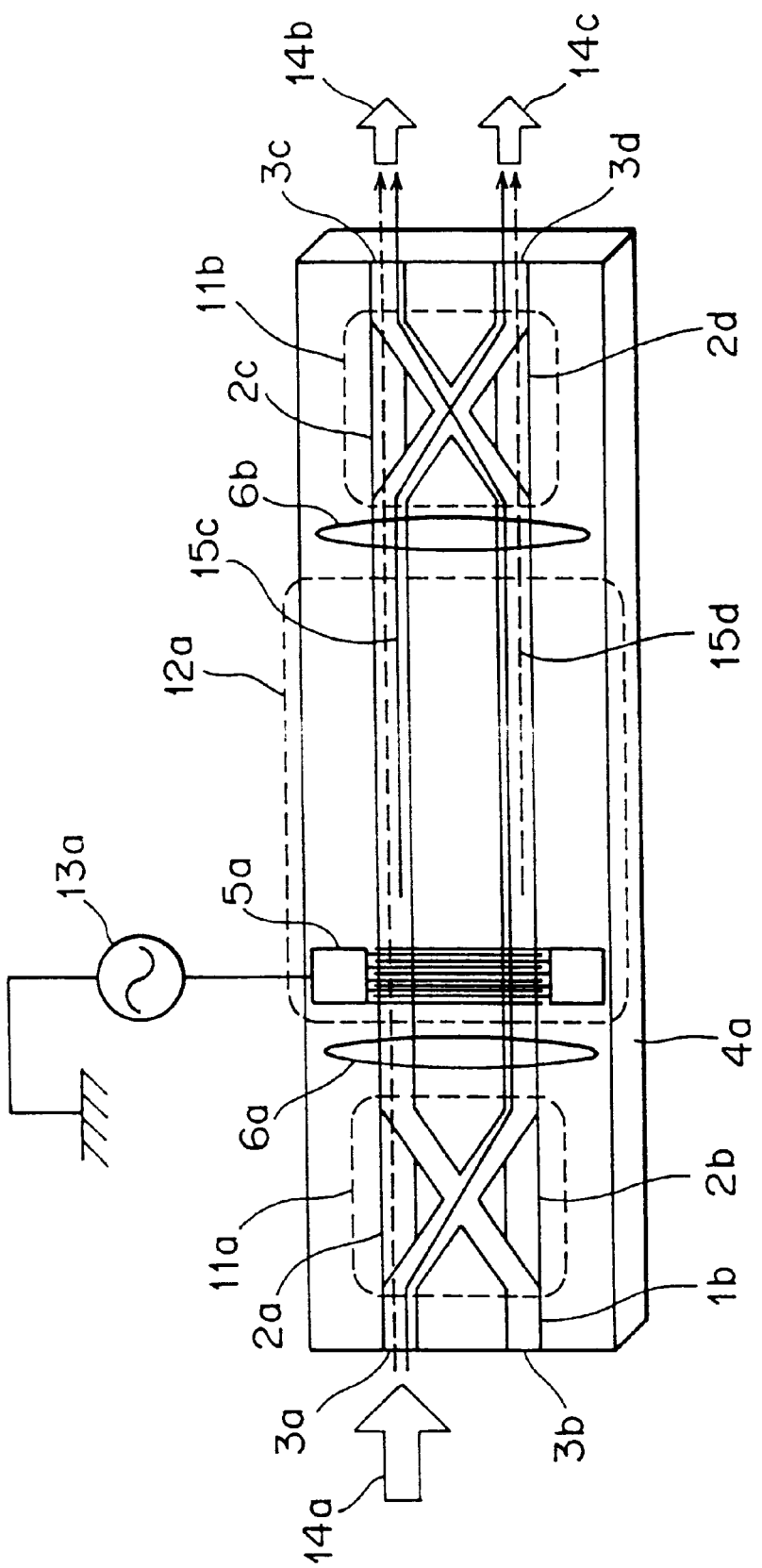
FIG. 1 shows a structure of a conventional TE-TM mode conversion, waveguide path type polarization independent optical wavelength tunable filter.
Figure 2:
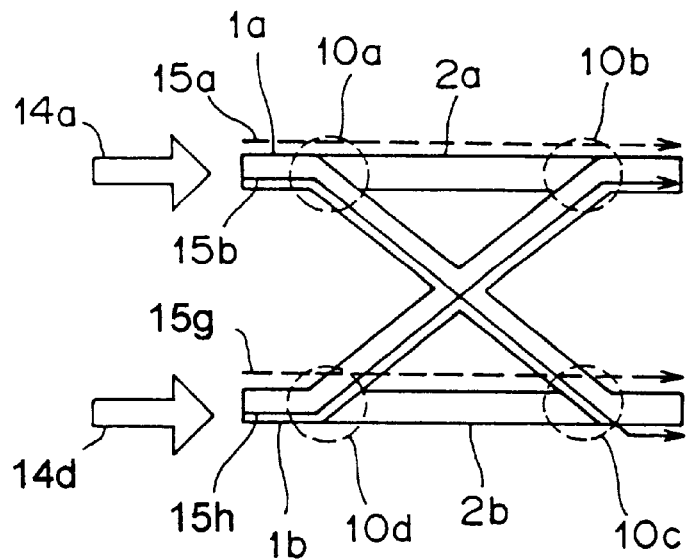
FIG. 2 is an explanatory view for explaining an operation of a polarization beam splitter of the optical wavelength tunable filter shown in FIG. 1.
Figure 3:
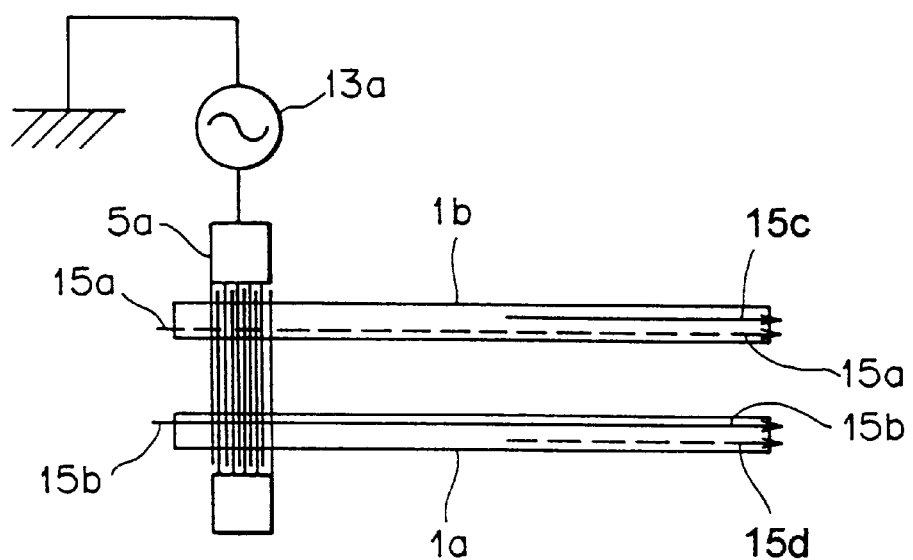
FIG. 3 is an explanatory view for explaining an operation of a TE-TM mode converter of the optical wavelength tunable filter shown in FIG. 1.
Figure 4B:
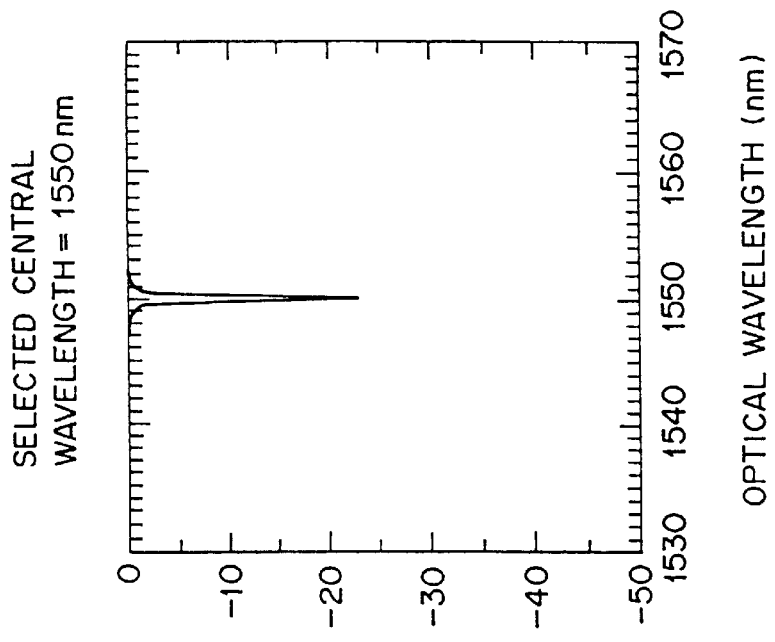
FIGS. 4A and 4B are views showing examples of filter characteristics of the optical wavelength tunable filter shown in FIG 1.
Figure 4A:
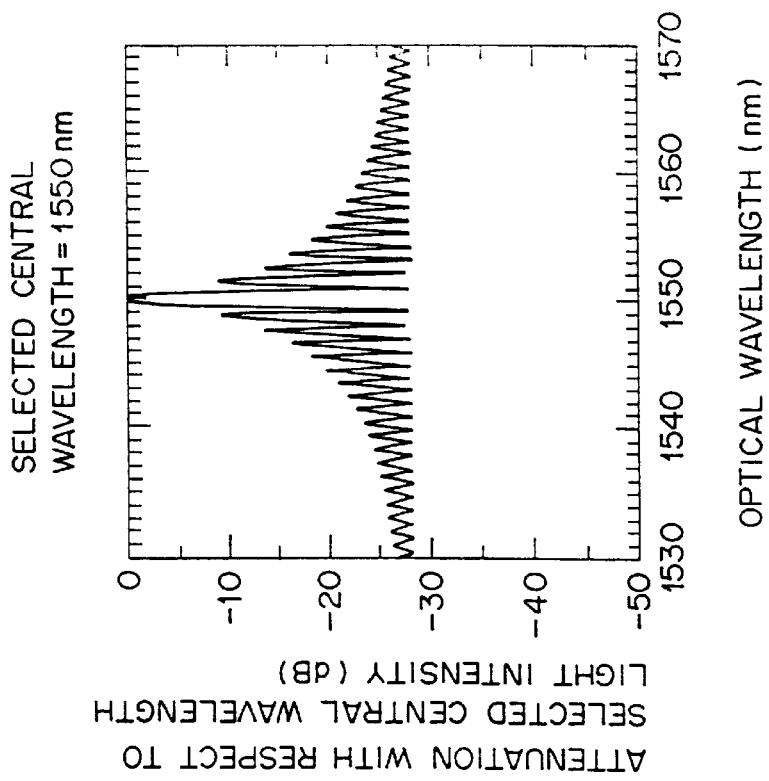
Figure 5:
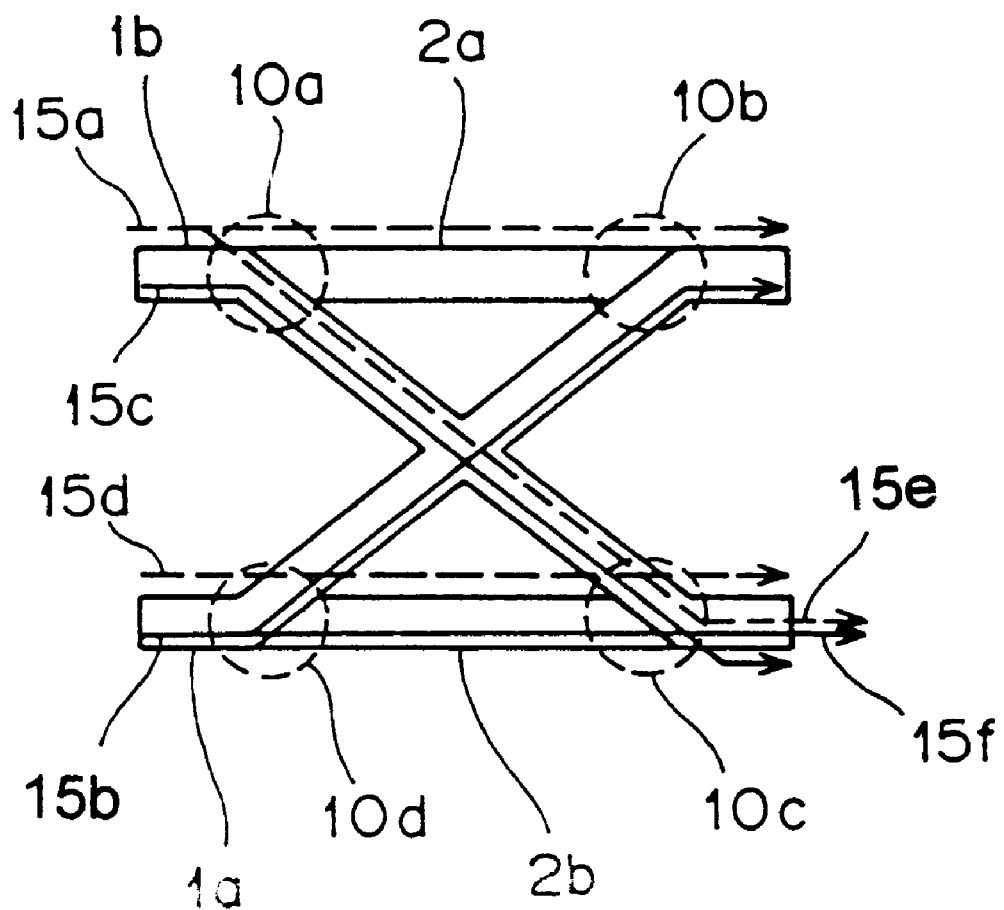
FIG. 5 is an explanatory view for explaining occurrence of noise due to non-selected components in a polarization beam splitter of the optical wavelength tunable filter shown in FIG 1.
Figure 6:
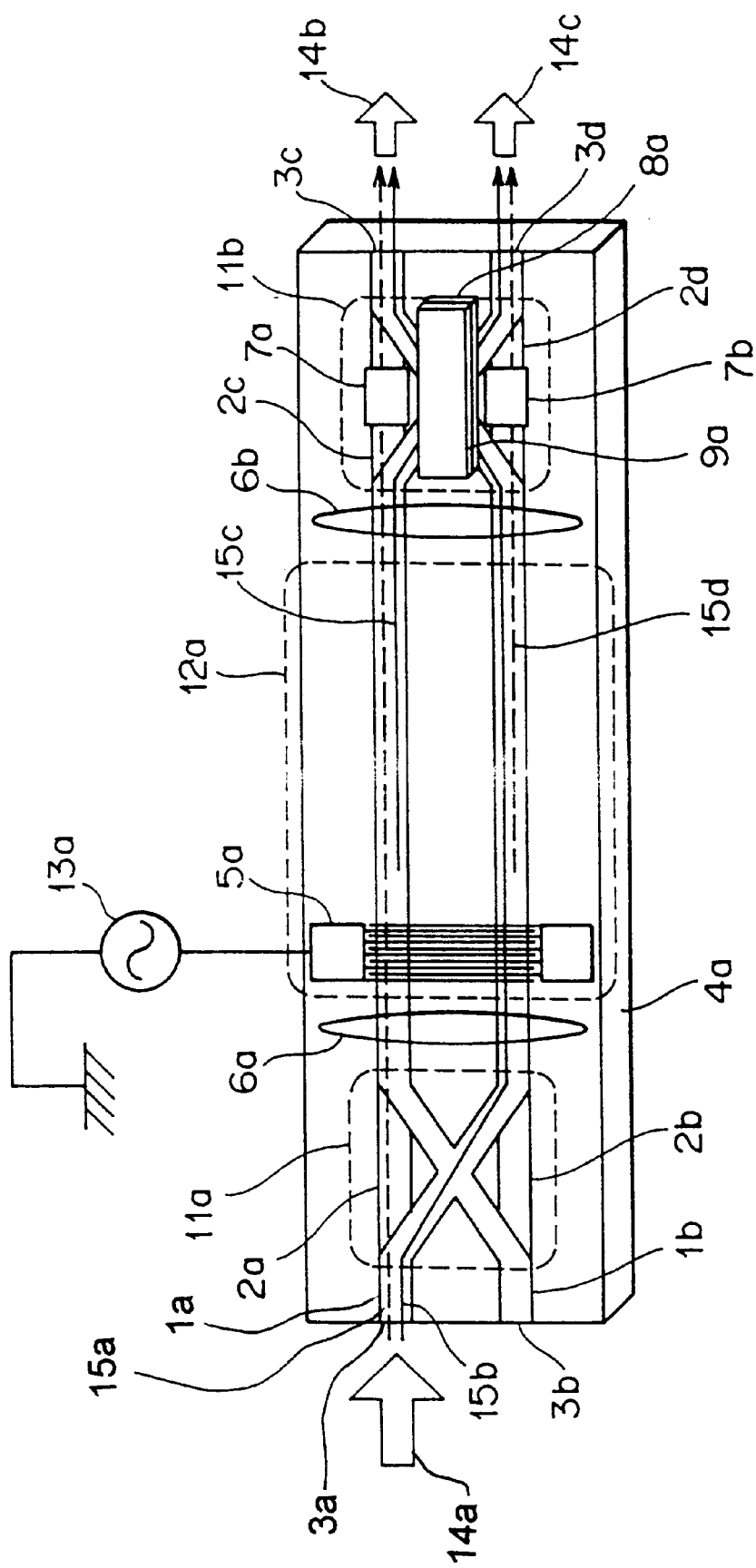
FIG. 6 is a view showing a waveguide path type polarization independent optical waveguide path tunable filter according to one embodiment of the present invention.

FIG. 6 shows a waveguide path type polarization independent optical wavelength tunable filter in this embodiment. Description will be given while the constituent elements of the filter in this embodiment common to those of the conventional filter are denoted by the same reference numerals.

The waveguide path type polarization independent optical tunable filter in the embodiment shown in FIG. 6 consists of two polarization beam splitters 11 (11a, 11b) including Ti diffusion optical waveguide paths 1 (1a, 1b) formed on a dielectric substrate 4a and anisotropic waveguide paths 2 (2a to 2d), and a mode converter 12a including the Ti diffusion optical waveguide path 1, a surface acoustic wave interdigital transducer 5a and an acoustic wave absorber 6a.

With the structure shown in FIG. 6, a layered film consisting of an $SiO_2$ film 8a and Si film 9a is formed right on the Ti diffusion optical waveguide path 1 of the polarization beam splitter 11b. A TE polarization component of a non-selected light on the Ti diffusion optical waveguide path 1 is thereby transferred to the layered film 8a, 9a and removed from the Ti diffusion optical waveguide path 1. Metal layers 7a, 7b are formed right on the anisotropic optical waveguide paths 2c, 2d of the polarization beam splitter 11b. A TM polarization component of a non-selected light on the anisotropic optical waveguide paths 2c, 2d is transferred to the metal films 7a, 7b and removed from the anisotropic optical waveguide paths 2c and 2d.

The waveguide path type polarization independent optical wavelength tunable filter in this embodiment will be described in detail in due order.

The waveguide path type polarization independent optical wavelength tunable filter in this embodiment is an X-cut Y-propagation $LiNbO_3$ waveguide path type optical wavelength tunable filter by using X-cut $LiNbO_3$ for the dielectric substrate 4a and setting a transmission axis to a Y axis.

Now, description will be given to a method for manufacturing the X-cut Y-propagation $LiNbO_3$ waveguide path type optical wavelength tunable filter.

In FIG. 6, a Ti film is deposited on the $LiNbO_3$ substrate 4a. After the resultant layer is patterned into an optical waveguide path pattern, it is subjected to thermal diffusion for a few hours to thereby form the Ti diffusion optical waveguide paths 1a, 1b and the anisotropic optical waveguide paths 2a, 2b, 2c and 2d. Thereafter, masking is effected so that ions can be exchanged only on the anisotropic optical waveguide paths 2a, 2b, 2c and 2d and then proton-exchange is effected for a few hours to thereby form the anisotropic optical waveguide paths 2a, 2b, 2c and 2d.

Next, a surface acoustic wave exciting interdigital transducer 5a is formed out of a metal film above the Ti diffusion optical waveguide paths 1a, 1b. Acoustic wave absorbers 6a, 6b are formed in front of and back of the surface acoustic wave exciting interdigital transducer 5a. Thereafter, a layered film consisting of an $SiO_2$ film 8a and Si film 9a is formed on the Ti diffusion optical waveguide path 1a within the polarization beam splitter 11b and metal films 7a and 7b are formed on the anisotropic optical waveguide paths 2c and 2d.

The polarization beam splitter 11a consists of the Ti diffusion waveguide paths 1a, 1b and the anisotropic waveguide paths 2a, 2b. The mode converter 12a consists of the Ti diffusion optical waveguide paths 1a, 2b, the surface acoustic exciting interdigital transducer 5a, and the acoustic wave absorbers 6a, 6b. The polarization beam splitter 11b consists of the Ti diffusion waveguide paths 1a, 1b, the anisotropic optical waveguide paths 2c, 2d, the metal films 7a, 7b, the $SiO_2$ film 8a and the Si film 9a.

Figure 7:
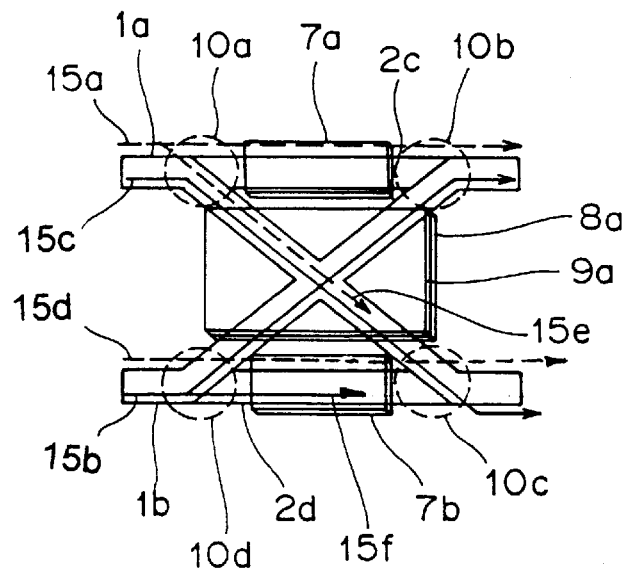
FIG. 7 is an explanatory view for explaining the operation of the optical wavelength tunable filter shown in FIG. 6.

Next, description will be given to an example of the operation of the waveguide path type polarization independent optical waveguide path tunable filter shown in FIG. 6, with reference to FIG. 7.

In FIG. 6, the light 14a incident on the input port 3a is separated into a TE polarization component 15a and a TM polarization component 15b introduced to the Ti diffusion optical waveguide paths 1b and 1a, respectively, by the polarization beam splitter 11a.

Only the wavelength which satisfies the phase matching condition by interaction with the refractive index grating Λ, of the TE polarization component 15a incident on the Ti diffusion optical waveguide path 1b is converted from the TE polarization component 15a to the TM polarization component 15c by the TE-TM mode converter 12a. Thereafter, the resultant TM polarization component 15c is introduced to the Ti diffusion optical waveguide path 1b by the polarization beam splitter 11b and outputted as the TM polarization component of the light 14c from the port 3d.

In addition, the TE polarization component 15a which has not been subjected to mode conversion is introduced to the Ti diffusion optical waveguide path 1a by the polarization beam splitter 11b and outputted as the TE polarization component of the light 14b from the port 3c.

Figure 8:
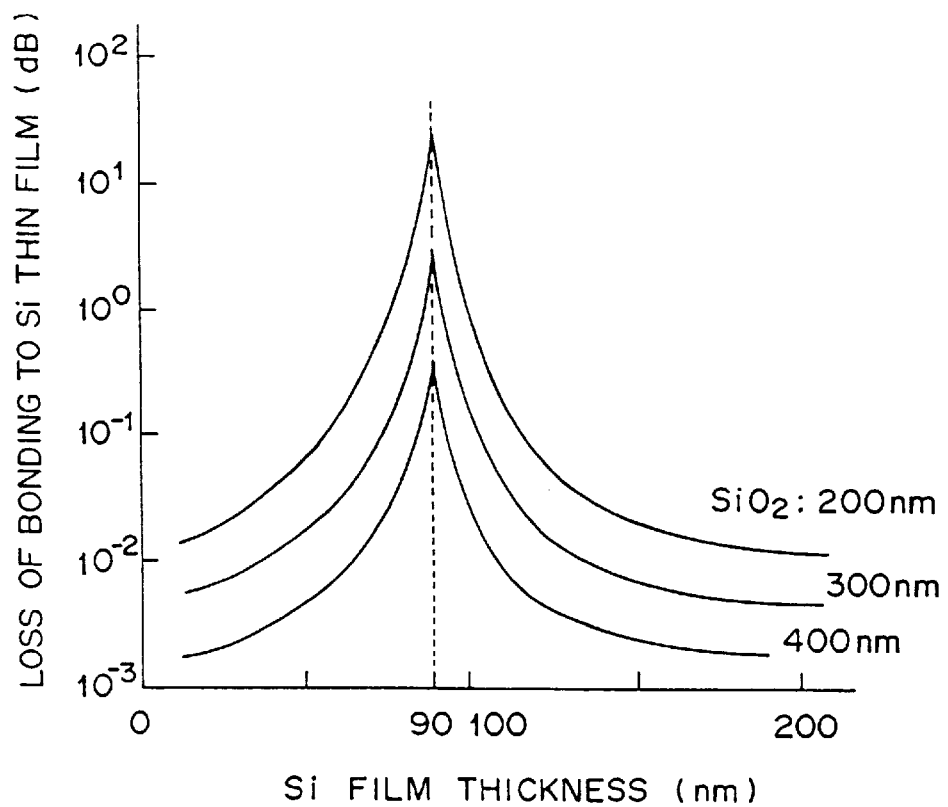
FIG. 8 is a view showing an example of coupling characteristics of a TE polarization component to an Si film.

At this moment, at the polarized light separation basic structural part 10a, the TE polarization component 15e of the non-selected light with polarized light separation quantity according to the control accuracy of, for example, an actual production process is also incident on the Ti diffusion optical waveguide path 1b. As shown in FIG. 7, while being transmitted to the Ti diffusion optical waveguide path 1b, the TE polarization component 15e of the non-selected light is coupled to the Si film 9a by setting the appropriate thickness of the $SiO_2$ film 8a and that of the Si film 9a as shown in FIG. 8, and removed from the Ti diffusion optical waveguide path 1b.

Meanwhile, only the wavelength which satisfies the phase matching condition by interaction with the refractive index grating Λ, of the TM polarization component 15b incident on the Ti diffusion optical waveguide path 2a is converted from the TM polarization component 15b to the TE polarization component 15d by the TE-TM mode converter 12a in the same manner as stated above. Thereafter, the resultant TE polarization component 15d is introduced to the Ti diffusion optical waveguide path 1b by the polarization beam splitter 11b and outputted as the TE polarization component of the light 14c from the port 3d.

The TM polarization component 15b which has not been subjected to mode conversion is introduced to the Ti diffusion optical waveguide path 1a by the polarization beam splitter 11b, and is outputted as the light 14b from the port 3c.

At this moment, at the polarized light separation basic structural part 10d, the TM polarization component 15f of the non-selected light with polarized light separation quantity according to the control accuracy of, for example, an actual production process is incident on the Ti diffusion optical waveguide path 1b. AS shown in FIG. 7, while being transmitted to the anisotropic optical waveguide path 2d, the TM polarization component 15f of the non-selected light is removed from the anisotropic optical waveguide path 2d by the metal film 7b.

The TE polarization component 15e of the non-selected light and TM polarization component 15f of the non-selected light, which become noise components for the selected light, incident on the Ti diffusion optical waveguide path 1b can be removed as stated above. Owing to this, it is possible to improve attenuation characteristics.

Next, description will be given to the result of manufacturing the waveguide path type polarization independent optical wavelength tunable filter shown in FIG. 6 and measuring the film characteristics.

First, X-cut $LiNbO_3$ was used as the dielectric substrate 4a and the transmission axis was set as the Y axis. The Ti diffusion optical waveguide paths 1a, 1b were formed to be 100 nm in Ti film thickness, 6 μm in Ti strip width at a diffusion temperature of 1050° C. for 8 hours.

The anisotropic optical waveguide paths 2a, 2b, 2c and 2d were formed to be 100 nm in Ti thickness, 6 μm in Ti strip width at a diffusion temperature of 1050° C. for 8 hours. Thereafter, the formed waveguide paths were subjected to proton-exchange at 250° C. for 3 minutes in a benzoic acid atmosphere and then to thermal treatment at 360° C. for 80 minutes in an oxygen atmosphere.

The interdigital transducer 5a for surface acoustic wave excitation was provided by forming a Cr film of a thickness of 50 nm and an Al film of a thickness of 200 nm by means of sputtering and patterning the resultant films. The metal films 7a and 7b were provided only right on the anisotropic optical waveguide paths 2c and 2d by forming an Al film of a thickness of 200 nm by means of spattering, and by patterning the resultant film to be 15 μm in width and 8 mm in length.

The $SiO_2$ film 8a and Si film 9a were provided by forming a film of a thickness of 200 nm and that of a thickness of 90 nm by means of sputtering, respectively and by patterning the resultant films to be 200 μm in width and 10 nm in length so as to be arranged only right on the Ti diffusion optical waveguide paths 1a, 1b within the polarization beam splitter 11b.

The acoustic wave absorbers 6a, 6b were formed by coating and thermosetting silicone adhesive. The interaction length of the TE-TM mode converter 12a was set at 30 nm.

The characteristics of the waveguide path type polarization independent optical wavelength tunable filter with the above-stated structure will be described.

Figure 9B:
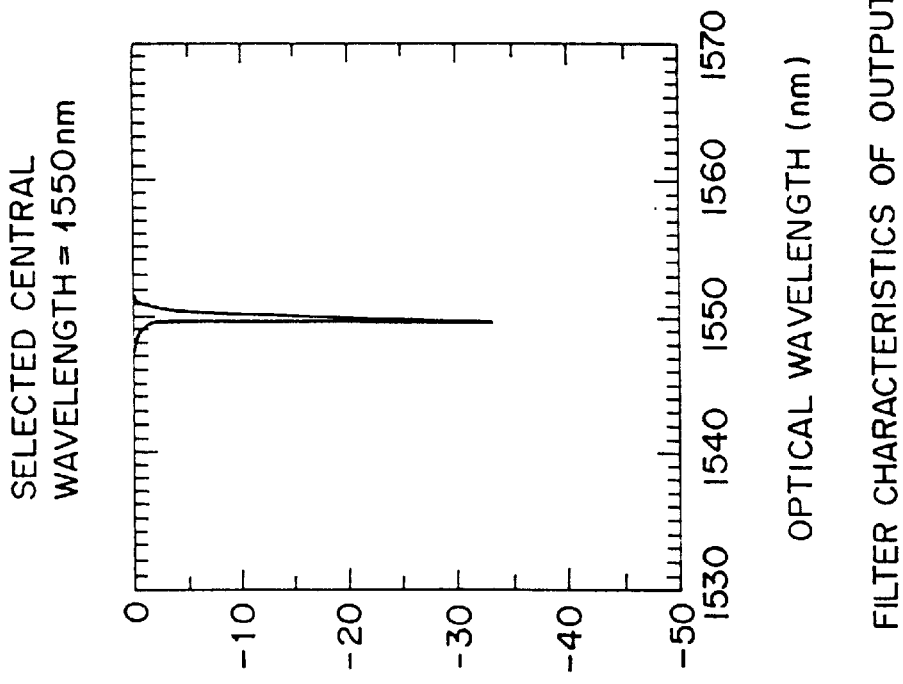
FIGS. 9A and 9B show examples of filter characteristics of the optical wavelength tunable filter shown in FIG. 6.
Figure 9A:
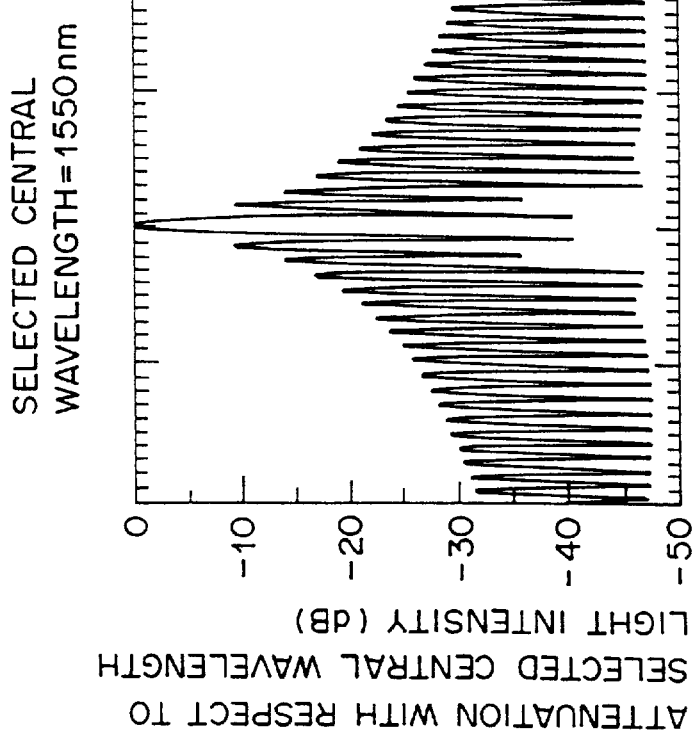

In FIG. 6, if the RF signal 13a was inputted with a frequency of 171.58 $MH_z$ at power of 30 mW, the filter characteristics of the selected light, i.e., the output light 14c from the port 3d was, for example, as shown in FIG. 9A. The filter characteristics was improved to −25.6 dB at a wavelength spaced from the transmission central wavelength by 10 nm, and to −31.3 dB at a wavelength spaced from the transmission central wavelength by 20 nm.

The filter characteristics of the non-selected light, i.e., the output light 14b from the port 3c was, for example, shown in FIG. 9B. The ratio (that is, through cross stroke) of the light intensity of a selection central wavelength at the selected light port to that at the non-selected light port was improved to 32.5 dB.

As stated so far, according to the waveguide path type polarization independent optical wavelength tunable filter in this embodiment, non-selected light components which become noise can be easily removed by the metal films 7a, 7b and SiO$_2$/Si films 8a, 9a in the polarization beam splitter 11b. As a result, filter characteristics can be improved without the need to maintain high accuracy for manufacturing the polarization beam splitter part.

Although the above-stated embodiment has illustrated a case where the metal films 7a and 7b are made of Al, it is possible to obtain equivalent advantage by forming the metal films 7a, 7b out of Au, Ti, Cr, Pt or the like. Besides, if the silicon (Si) film thickness is 90±5 nm, the same advantage can be obtained, as well.

Figure 10:
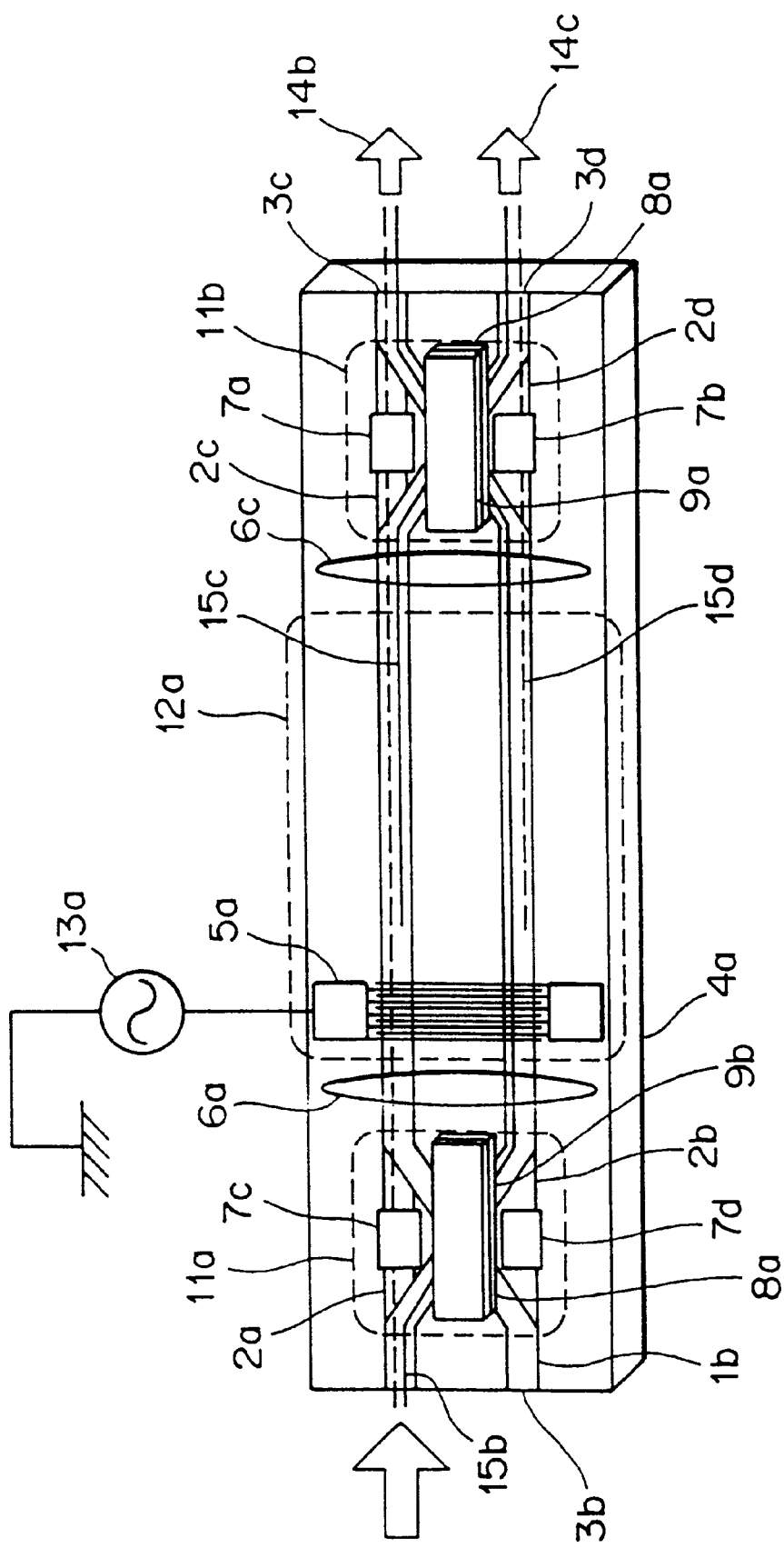
FIG. 10 shows a waveguide path type polarization independent optical wavelength tunable filter according to another embodiment of the present invention.

The above-stated embodiment has illustrated a case where the polarization beam splitter 11b is provided with the SiO$_2$ film 8a, Si film 9a and metal films 7a, 7b. If the polarization beam splitter 11a is similarly provided with the SiO$_2$ film 8b, Si film 9b and metal films 7c, 7d as shown in FIG. 10, greater advantage can be obtained.

Since the constitutions and operations of the SiO$_2$ film 8b, Si film 9b and metal films 7c, 7d are the same as those of the SiO$_2$ film 8a, Si film 9a and metal films 7a, 7b, no description will be given herein.

What is claimed is:

1. A waveguide path type polarization independent optical wavelength tunable filter comprising:

a dielectric substrate;

two polarization beam splitters provided on the dielectric substrate, said two polarization beam splitters including:

a first optical waveguide path formed on a surface of said dielectric substrate; and an anisotropic optical waveguide path, wherein at least one of said polarization beam splitters includes:

a first thin film, formed on said first optical waveguide path, having a refractive index lower than that of said first optical waveguide path;

a second thin film, formed on said first thin film, having a refractive index higher than that of said first optical waveguide path; and a metal thin film formed on said anisotropic optical waveguide path of at least one of said polarization beam splitters;

a TE-TM mode converter arranged between said two polarization beam splitters on said dielectric substrate, said TE-TM mode converter including:

a second optical waveguide path continuous to the first optical waveguide path of said polarization beam splitters formed on the surface of said substrate; and an interdigital transducer, arranged right over said second optical waveguide path, for exciting a surface acoustic wave.

2. A waveguide path type polarization independent optical wavelength tunable filter according to claim 1, wherein said dielectric substrate is a lithium niobate substrate.

3. A waveguide path type polarization independent optical wavelength tunable filter according to claim 2, wherein said first thin film is an SiO$_2$ film and said second thin film is an Si film.

4. A waveguide path type polarization independent optical wavelength tunable filter according to claim 2, wherein said optical waveguide paths are formed by thermally diffusing titanium to said substrate surface, and said anisotropic optical waveguide path is formed by thermally diffusing titanium to the substrate surface and then effecting ion-exchange treatment.

5. A waveguide path type polarization independent optical wavelength tunable filter according to claim 1, wherein said metal thin film is made of aluminum.

6. A waveguide path type polarization independent optical wavelength tunable filter according to claim 1, wherein said TE-TM mode converter further includes an acoustic wave absorber for absorbing a surface acoustic wave, which is installed right over said optical waveguide paths.

7. A waveguide path type polarization independent optical wavelength tunable filter according to claim 1, wherein said TE-TM mode converter further includes an oscillator circuit for supplying a high-frequency signal to said interdigital transducer.

* * * * *